Patented Feb. 23, 1937

2,071,625

UNITED STATES PATENT OFFICE 2,071,625

PRESERVATION OF PACKAGED FOOD PRODUCTS

Louis W. Haas, Chicago, and John W. Read, Glen Ellyn, Ill., assignors to The W. E. Long Co., a corporation of Illinois No Drawing. Application June 3, 1931, Serial No. 541,954

11 Claims. (Cl. 99—172)

This invention relates to the preservation of bread and other perishable food products, and more especially to the prevention of moldiness of packaged bread and other dry surfaced edible products.

The principal object of the invention is the provision of a new and improved method of treating packaged edible products to prevent the growth of micro-organisms on the same, and thus prevent premature deterioration of these perishable products.

Another object of the invention is the provision of a new and improved wrapping material for use in enclosing perishable products and the like.

A further object of the invention is the provision of a new and improved method of treating wrapping material used in packaging perishable products.

A still further object of the invention is the provision of a new and improved wrapping material together with a novel method of employing the same for preserving packaged perishable articles that is inexpensive, efficient, and that requires a minimum departure from the present system of packaging such articles.

Other and further objects and advantages of the invention will appear from the following description.

It is common practice to wrap bread and other edible products in wrapping material that has been treated with paraffin to provide a substantially air and moisture proof covering in order to prevent undue evaporation of moisture, with a consequent loss of weight. Since bread and other baking products are wrapped while still slightly warm, the air around the bread will become partially or wholly saturated with vapor which in turn will soften the crust or surface of the bread and in such condition offers an excellent medium for the growth of mold and other micro-organisms.

In certain sections, especially in the warmer climates, and in all sections during the warm seasons, the loss to the baking industry alone of products spoiled due to moldiness, is enormous. The use of wrapping material treated with paraffin will not prevent the mold for the reason that while the bread, which may be used as a typical product, comes from the oven in a sterilized condition, it will be contaminated in one way or another by subsequent handling. No matter how sanitarily bread is handled in the plant, contamination with mold spores is inevitable, since the atmosphere around the wrapping machines and the parts of the equipment contacting bread and wrapping paper cannot be kept absolutely sterile. Further, sterilization of bread and wrapping material in putting on the wrapper, or of the wrapped package, is impracticable with the present means.

Our method seeks to sterilize the air space under the wrapper and the outer surface of the bread and the inner surface of the liner by the use of germicide antiseptics which are highly effective against mold spores and all other germ life, but which are non-poisonous to human beings and do not perceptibly affect the flavor of the protected product. We have found those compounds satisfactory for our purposes, which slowly liberate free chlorine, especially in contact with damp air. Chlorine is known to be a very effective germicide and is extensively used for sterilizing potable water and other materials used for human food. The hypochlorites of sodium, potassium, and calcium are suitable as a source of chlorine for our purposes, but the organic compounds of the chloramine-T type are especially useful because of their greater stability. The two best known of these organic compounds are chlorazene or chloramine-T and dichloramine or dichloramine-T.

Chlorazene is chemically sodium para-toluene-disulfonchloramine and contains up to 13% active chlorine. It is soluble in water.

Dichloramine is para-toluenesulfondichloramide. It contains 28–30% active chlorine, is insoluble in water and is not taken internally.

Our invention is practiced by enveloping the bread or other product in a covering which is treated or impregnated with a suitable quantity of a harmless compound that liberates a germicidal gas. In case more than one layer of covering or wrapping material is used the treated or impregnated one is arranged next to the bread or other product to be protected.

The use of a germicidal cover of this type practically sterilizes the surface of both the product it is to protect and the air space beneath this cover and the product. This effect is obtained by the chlorine liberated by the germicide.

Where only one covering is used for wrapping or packaging the product and if this covering is impregnated with wax to make it air and moisture proof, the germicide may be incorporated in the wax. It was found that 3 to 5% dichloramine in the paraffin used for waxing the covering material provides very satisfactory protection. Of course, in some cases less or more may have to be used according to the degree of infection and the nature of the product. In case of bread wrappers, more than 8% germicide in the wax impairs the flavor of the bread.

An unwaxed covering or inner liner may be impregnated with a suitable solution of the germicide, and the solvent allowed to evaporate spontaneously or removed in any other practical way. In case of dichloramine, 1% solutions in carbon tetrachloride were found to impart satisfactory germicidal power to paper impregnated with it, but paper treated with 0.5% solutions of dichloramine in the same solvent proved to be rather effective against mold. Other volatile organic solvents may be used instead of carbon tetrachloride.

Chlorazene may be used in aqueous solution of the desired strength for the impregnation of unwaxed covering material. Concentrations below 5% do not impart satisfactory germicidal power to unwaxed bread wrapping paper. However, the potency of chlorazene treated paper can be greatly enhanced by the presence of common salt in the impregnating solution.

Thus paper treated with a solution containing 1% of chlorazene and 10% NaCl had about as good a germicidal effect as a 5% solution of the germicide alone. Using 10% salt in the impregnating solution, as low a concentration as 0.5% of chlorazene gives sufficient protection for most requirements.

The wrapping or covering material treated or impregnated with both chlorazene and dichloramine will suffer but little impairment of their fungicidal efficiency for a long time if it is stored at ordinary temperature under proper conditions. At ordinary room temperature the treated paper may be kept for months without serious weakening of its germicidal power. Because of this very satisfactory stability, the germicidal covering may be prepared months in advance and put up in the same fashion as ordinary wrapping paper and the germicidal covering may be put on the bread or other products in the same way, and with the same means, as the ordinary wrapping or packaging covering.

We claim as our invention:

1. A method of preserving packaged bakery food products which consists in treating package material with a solvent containing volatile antiseptic agent expelling the solvent and then enclosing said products within said material whereby when said products are at a temperature above the surrounding atmosphere an antiseptic gas will be formed within the wrapper enclosing said products.

2. Antiseptic package material adapted to be wrapped about bakery products, said material being dry and containing a germicide that will emit free chlorine in the presence of moisture given off by said products.

3. A method of preserving bakery products which consists in wrapping said products, while the same are warm enough to emit vapor, in a dry wrapper that has been impregnated with a chemical that liberates a germicidal gas in the presence of said vapor for sterilizing the air contained in the space between said wrapper and product and then sealing the wrapper.

4. A method of sterilizing the exterior surface of bakery products which consists in enclosing said products in air-proof wrappers in dry condition associating with said products and wrappers a material in dry form that will emit an antiseptic in gaseous form within said wrappers in the presence of moisture emitted by said products and finally sealing said wrappers.

5. Package material for enclosing bakery products comprising fabricated wrapping material having a coating of wax impregnated with an antiseptic compound adapted to gradually liberate a germicidal gas when said products are enclosed while emitting vapors.

6. A package material for enclosing bakery products comprising a dry wrapping member impregnated with chlorazene and dichloramine for liberating a germicidal gas when said member encloses said product while in a warm condition.

7. Package material for enclosing bakery products while in vapor emitting condition comprising a dry wrapping member impregnated with chlorazene for reacting on said vapor to liberate a germicidal gas, and sodium chloride.

8. A method of treating package material for enclosing bakery products to render the same air and moisture-proof and to impart to the same germicidal properties of emitting a germicidal gas in the presence of moisture emitted by said material which consists in incorporating in melted paraffin a quantity of dichloramine not to exceed 5% of the mass, and then treating said material with the mixture.

9. A method of preserving bakery products adapted to emit a water vapor when in a warm condition which consists in enclosing said products while in vapor emitting condition in a wrapper having associated therewith a chemical that liberates a germicidal gas in the presence of said vapor for sterilizing the air within said wrapper.

10. A package material for enclosing bakery products comprising a dry wrapping member impregnated with an organic compound of the chloramine-T type and sodium chloride in dry form, said material being adapted to liberate an antiseptic gas in the presence of moisture emitted by said products when enclosed in said material.

11. A method of sterilizing the surface of bakery products which consists in enclosing said products in wrappers in dry condition, associating with said products and wrappers a material in dry form that will, in the presence of vapor emitted by said products, emit an antiseptic in gaseous form within said wrappers for destroying mold spores on the surface of said products.

LOUIS W. HAAS.
JOHN W. READ.